(12) United States Patent
Petridis et al.

(10) Patent No.: US 7,810,478 B2
(45) Date of Patent: Oct. 12, 2010

(54) SYSTEM AND METHOD FOR FACILITATING HOMOGENEOUS CHARGE COMPRESSION IGNITION

(75) Inventors: Themi Petridis, Epping (GB); Lucien Koopmans, Hovas (SE); Jonas Elfstrand, Partille (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/730,514

(22) Filed: Mar. 24, 2010

(65) Prior Publication Data

US 2010/0175672 A1  Jul. 15, 2010

Related U.S. Application Data

(63) Continuation of application No. 11/424,822, filed on Jun. 16, 2006, now Pat. No. 7,690,368.

(51) Int. Cl.
*F02P 15/08* (2006.01)
(52) U.S. Cl. ............... 123/636; 123/406.55; 123/145 R
(58) Field of Classification Search ............ 123/406.55, 123/636–638, 145 R, 145 A
See application file for complete search history.

(56) References Cited

U.S. PATENT DOCUMENTS

| 3,970,049 | A | * | 7/1976 | Yamaguchi et al. | ......... 123/211 |
|---|---|---|---|---|---|
| 4,170,212 | A | * | 10/1979 | Mori et al. | .................. 123/211 |
| 6,237,562 | B1 | * | 5/2001 | Awasaka et al. | ............ 123/305 |
| 7,168,420 | B1 | * | 1/2007 | Yang | ..................... 123/568.15 |
| 7,234,438 | B2 | * | 6/2007 | Yang | ......................... 123/295 |
| 7,240,659 | B2 | * | 7/2007 | Yang | ......................... 123/295 |
| 7,703,438 | B2 | * | 4/2010 | Petridis et al. | ......... 123/406.55 |

* cited by examiner

*Primary Examiner*—Hai H Huynh
(74) *Attorney, Agent, or Firm*—Allan J. Lippa; Alleman Hall McCoy Russell & Tuttle LLP

(57) ABSTRACT

A method of transitioning between homogeneous charge compression ignition and spark ignition in a combustion chamber of an engine that is configured for homogeneous charge compression ignition under at least some engine operating conditions and for spark ignition under at least some engine operating conditions, the method comprising heating contents of the combustion chamber with a glow plug prior to transitioning between homogeneous charge compression ignition and spark ignition.

20 Claims, 3 Drawing Sheets

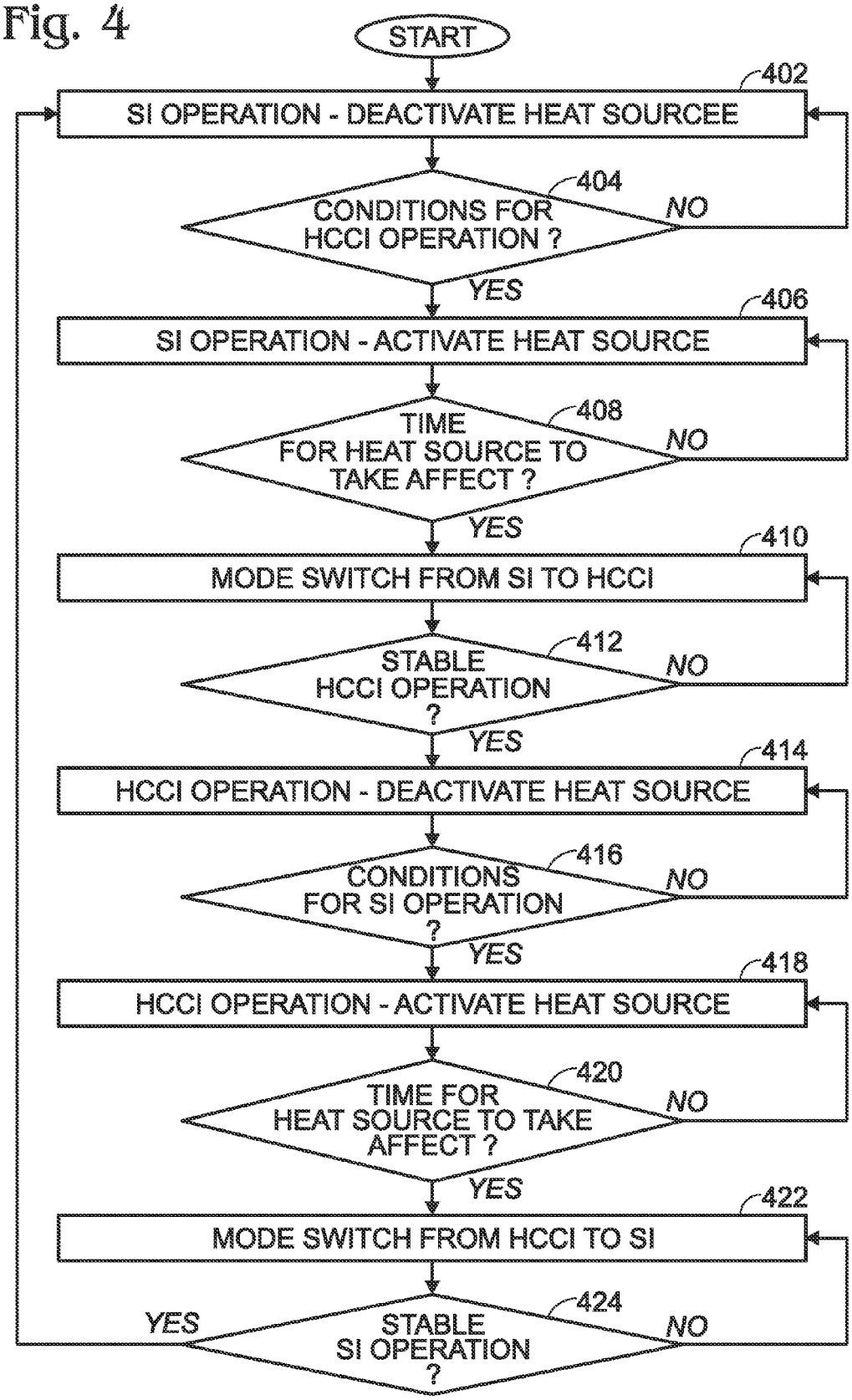

SYSTEM AND METHOD FOR FACILITATING HOMOGENEOUS CHARGE COMPRESSION IGNITION

CROSS REFERENCE TO RELATED APPLICATION

The present application is a continuation of U.S. patent application Ser. No. 11/424,822, filed Jun. 16, 2006, entitled "System and Method for Facilitating Homogeneous Charge Compression Ignition", the entire contents of each of which are incorporated herein by reference.

BACKGROUND AND SUMMARY

Internal combustion engines convert chemical energy in a fuel to mechanical energy. As part of the conversion, the fuel can be combusted, thus causing hot combustion products to expand within the engine. The expansion of the combustion products can be used to move mechanical components of the engine, such as pistons. Combustion reactions can have several products, or emissions, some of which can be undesirable. For example, when hydrocarbons are used as fuel, combustion products can include HC, CO, $CO_2$ and NOx.

An internal combustion engine may operate in one or more combustion modes. One example mode is spark ignition (SI), where an electric spark from a sparking device is used to initiate combustion of an air and fuel mixture. Another example mode is homogeneous charge compression ignition (HCCI), where an air and fuel mixture achieves a temperature where autoignition occurs without requiring a spark from a sparking device. In some conditions, HCCI may have greater fuel efficiency, reduced NOx production, and/or other advantages compared to SI. However, in some conditions, such as with high or low engine loads and/or high or low engine speeds, it may be difficult to achieve reliable HCCI combustion.

Numerous attempts have been made to design a dual combustion mode engine that is configured to utilize SI during some conditions and HCCI during other conditions. For example, U.S. Pat. No. 6,619,254 describes a dual combustion mode engine that uses SI and HCCI. Further, a third combustion mode is described where under certain operating conditions the pressure, temperature, and composition of the charge are set in such a way that the self-ignition capability is just short of being reached, and an external energy source in the form of an electric spark or an additionally injected quantity of fuel is used to trigger ignition.

The inventors herein have recognized disadvantages with previous attempts at HCCI operating mode engines, including dual mode engines that use SI combustion at least some of the time. Since SI combustion is generally hotter than HCCI combustion, when switching from SI operation to HCCI operation, there is a period when the temperature of combustion is decreasing with each combustion event and a hybrid SI-HCCI combustion occurs. Similarly, when switching back into SI operation, the temperature of combustion is expected to increase back up to SI levels during the hybrid combustion phase. This hybrid combustion is suboptimal in terms of stability, efficiency, and emissions generation. If not well controlled, such a hybrid combustion can cause misfire, and in an extreme case, combustion can cease altogether.

Furthermore, if a spark assist is used during transition periods between SI and HCCI operation, some of the benefits of HCCI may not be fully realized. In particular, NOx emissions and/or fuel economy may be less favorable than if HCCI was used without spark assist.

Thus, it may be advantageous to improve transition control of a plural combustion mode engine (e.g., SI/HCCI), with or without using a spark assist. In one approach, transition control may be addressed by heating contents of a combustion chamber with a device having a small thermal inertia (e.g., a glow plug) when transitioning between SI and homogeneous charge compression ignition. In this way, it may be possible to decrease SI or hybrid SI/HCCI in favor of HCCI, thus further realizing benefits of HCCI.

BRIEF DESCRIPTION OF DRAWINGS

FIG. 4 is a flow chart showing an exemplary HCCI mode switching control procedure.

WRITTEN DESCRIPTION

Figure 1:
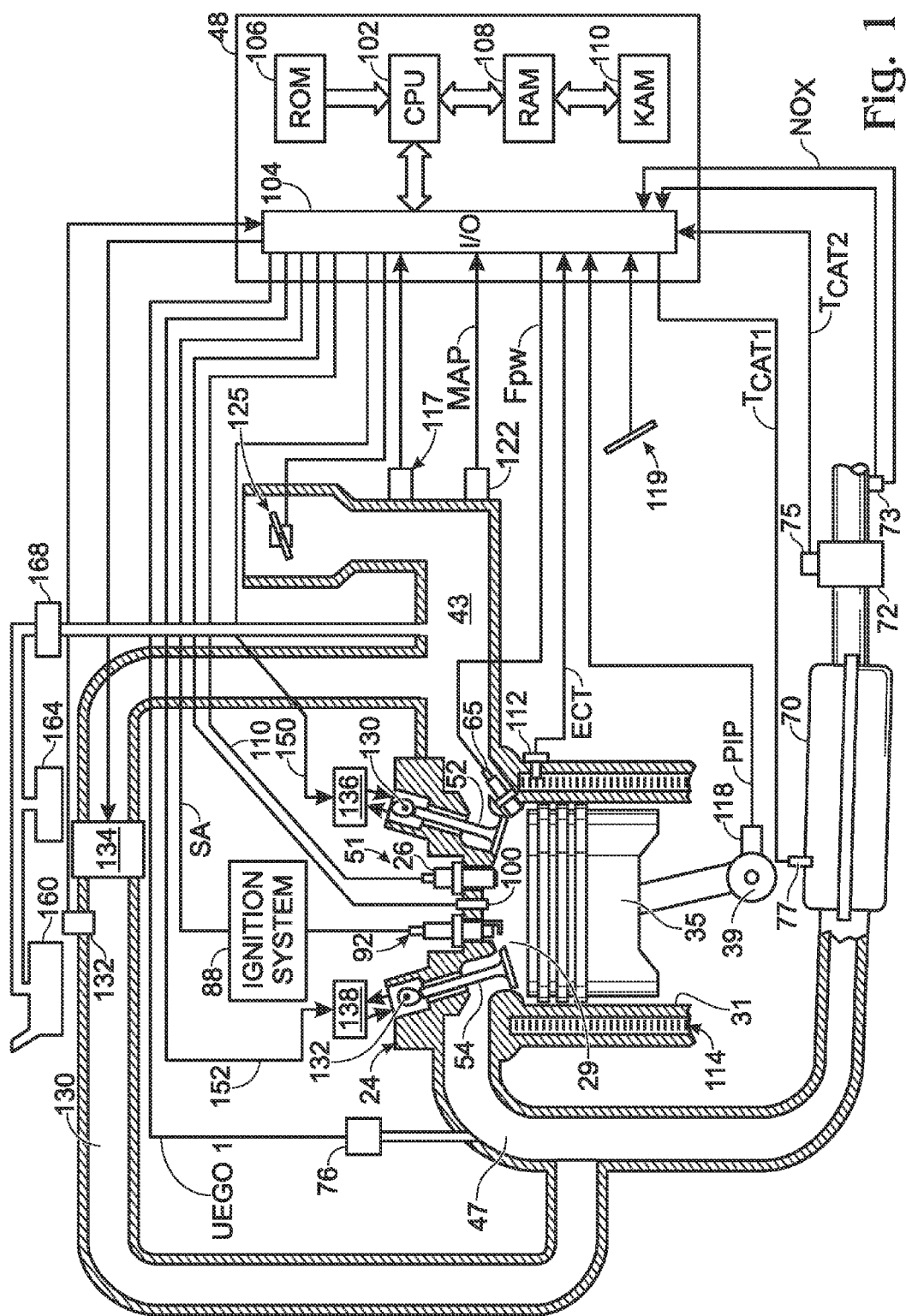
FIG. 1 shows an exemplary engine system including a heating device with a low thermal inertia for heating contents of a cylinder.

The present disclosure is directed to a system and method for facilitating homogeneous charge compression ignition (HCCI) in an internal combustion engine. HCCI is different than the propagation mode of combustion. HCCI engines can introduce a homogeneous mixture of fuel and air into a combustion chamber, where compression heating of the charge leads to simultaneous (or near simultaneous) ignition throughout substantially the entire charge. HCCI is thus different than a flame propagation combustion mode, where ignition first occurs at a distinct point, and then forms a flame front that advances from the ignition point.

According to some aspects of the disclosure, a heating device with a small thermal inertia herein referred to as a glow plug, can be used to add heat directly to a combustion chamber, thus facilitating HCCI. During some conditions, such as at low engine load and/or speed, the cooler engine operation may make it difficult to sustain HCCI combustion, thus combustion may be phased later than desired and/or misfire may occur. Heat added via a glow plug can be used to initiate autoignition by increasing the temperature of the mixture in the vicinity of the plug. Hence during conditions where the desired autoignition conditions are difficult to achieve, combustion may be phased earlier and/or misfire may be avoided. In this manner, an extremely fast heat response may be achieved, thereby facilitating operation in HCCI. Further, this approach may be especially useful during other periods of low speed and/or low load operation, such as during a gear change, to avoid switching into SI mode during the gear change and then switching back into HCCI afterwards. In yet another approach, this technique could also be used during steady state low speed and/or low load HCCI operation or other engine operating conditions that may not otherwise be conducive to HCCI.

Unlike prior art engines, such as diesel engines, which have used glow plugs to cold start an engine, the present disclosure provides for the use of glow plugs to heat a combustion chamber throughout different phases of engine operation. Adding heat from an external source can provide a stabilizing force during SI/HCCI mode switching and/or when engine operating conditions are near boundary conditions where HCCI begins to be suitable. Heat can be added during transition periods between SI and HCCI. Heat can also be added during transitory periods where engine operating conditions temporarily are outside the bounds of where HCCI can occur without assistance from a glow plug, but relatively quickly return to an unassisted operating region (e.g., during gear changes). Heat can also be added for sustained periods in which an engine operating condition is outside the bounds of where HCCI can occur without assistance from a glow plug, thus effectively increasing the steady-state conditions in which HCCI is available. Because heat from a glow plug can be added relatively quickly, heat from a glow plug can serve as a short term facilitator of HCCI until another heat source, such as exhaust gas, has time to facilitate HCCI. Heat can be added to an engine that uses only homogeneous charge compression, or to an engine that uses homogeneous charge compression and one or more other types of ignition, such as SI.

Transitions between HCCI and SI may be facilitated by varying one or more parameters, including, but not limited to: air/fuel ratio, throttle position, amount of fuel injected, timing of fuel injection(s), number of fuel injections performed during a cycle, intake and/or exhaust valve timing, spark timing, contribution of EGR, EGR cooling, intake air heating/cooling, turbocharging/supercharging, adding heat via a glow plug or other heating source, etc.

FIG. 1 schematically shows a direct injection gasoline engine 24 that includes a glow plug 26 that is configured to selectively add heat directly to a combustion chamber 29. Combustion chamber 29 is partially defined by cylinder walls 31 and piston 35. The piston is connected to crankshaft 39. Combustion of air and fuel mixtures within the combustion chamber can cause the pistons to move, and movement of the pistons can be translated to other components, such as crankshaft 39.

As will be described in more detail below, combustion in engine 24 can be of various types, depending on a variety of conditions. SI may be used where the engine utilizes a sparking device to perform a spark so that a mixture of air and fuel combusts. HCCI may be used where a substantially homogeneous air and fuel mixture attains an autoignition temperature within the combustion chamber and combusts without requiring a spark from a sparking device. Other types of combustion may be possible. For example, the engine may operate in a spark assist mode, wherein a spark is used to indirectly initiate autoignition of a part of an air and fuel mixture and residuals. The engine may also operate in other compression ignition modes, wherein a mixture of air, fuel and residuals are not necessarily homogeneous. Furthermore, and as is described in more detail below, heat can be added to a cylinder (without spark) to facilitate reaching an autoignition temperature where homogeneous charge compression occurs. The above listed combustion modes are non-limiting examples, and additional or alternative modes can be used.

As used herein, a "glow plug" can be virtually any device and/or assembly adapted to add heat directly to a cylinder. A glow plug can be a resistive element that increases temperature responsive to an applied voltage/current. A glow plug can be configured to increase temperature without creating a spark or other type of open flame that would prematurely ignite a charge, thus undesirably preempting HCCI. In other words, a glow plugs heating mechanism can differ from that of the spark plug, and therefore facilitate a different type of combustion than the spark plug. Depending on a chosen configuration, a glow plug can heat a cylinder from one or more specific locations, or the glow plug can heat a cylinder more evenly throughout the cylinder. For example, a glow plug can be a plug-shaped device positioned at a particular location in the cylinder, or the glow plug can be applied to and/or integrated with one or more portions of the cylinder wall to provide more distributed heating. In some embodiments, two or more glow plugs can be used in a cylinder.

In FIG. 1, glow plug 26 is illustrated as a plug shaped device located near the top of the combustion chamber, although such a configuration and/or positioning is not required. In some embodiments, glow plug 26 may include a combustion sensor for detecting the timing of the combustion and/or whether combustion has occurred. By detecting combustion within the combustion chamber, HCCI operation may be assessed and the autoignition timing may be adjusted as desired, for example, via heat added by the glow plug and/or an adjustment of one or more other operating conditions. In some embodiments, combustion chamber 29 may include a dedicated combustion sensor 100 for detecting the occurrence and/or timing of combustion. Combustion sensor 100 or other combustion sensing devices may detect combustion by sensing the peak pressure within the combustion chamber. As will be described herein in greater detail, the detection of combustion timing may be used as feedback for glow plug control.

To initiate SI, engine 24 includes a distributorless ignition system 88 that provides ignition spark to combustion chamber 29 via spark plug 92, although other sparking arrangements are within the scope of this disclosure. A control system 48 can be used to command spark plug 92, or another sparking device, to spark at desired times. In some embodiments, spark plug 92 may be operated as a combustion sensor. For example, spark plug 92 may be used to detect various products of combustion such as ions within the combustion chamber using an approach known as ion sensing. The control system can cooperate with a plurality of sensors, examples of which are described below, to assess engine operating conditions suitable for SI. Assessing engine operating conditions suitable for SI may at least partially include assessing engine operating conditions that are not suitable for HCCI. In other words, control system 48 may attempt to maximize the time that engine 24 uses HCCI, resorting to SI when engine operating conditions are not suitable for HCCI. Nonlimiting examples of parameters that may be monitored to assess whether engine operating conditions are suitable for SI include engine speed, engine load, combustion chamber temperature, manifold pressure, and intake air temperature. In some embodiments, combustion chamber temperature may be assessed by and/or deduced from at least one of a detection of the cylinder wall temperature via a sensor such as 112, temperature of the gasses and/or ions within the combustion chamber via a sensor disposed therein (e.g. ion sensor, temperature sensor, etc.), temperature of the exhaust gases flowing from the combustion chamber via a temperature sensor within the exhaust passage and/or detection of various combustion products, etc.

During SI mode, the temperature of intake air entering the combustion chamber may be near ambient air temperature and therefore may be substantially lower than the temperature required for autoignition of the air and fuel mixture. Since a spark is used to initiate combustion in SI mode, control of intake air temperature may be more flexible as compared to HCCI mode. Thus, SI mode may be utilized across a broad range of operating conditions (such as higher or lower engine loads), however SI mode may produce different levels of emissions and fuel efficiency under some conditions compared to HCCI combustion.

In some conditions, during SI mode operation, engine knock may occur if the temperature within the combustion chamber is too high. Thus, under these conditions, engine operating conditions may be adjusted so that engine knock is reduced, such as by retarding ignition timing, reducing intake charge temperature, varying combustion air-fuel ratio, or combinations thereof.

During HCCI mode operation, the air/fuel mixture may be highly diluted by air and/or residuals (e.g. lean of stoichiometry), which results in lower combustion gas temperature. Thus, at least some engine emissions may be substantially lower than SI combustion under some conditions. Further, fuel efficiency with autoignition of lean (or diluted) air/fuel mixture may be increased by reducing the engine pumping loss, increasing gas specific heat ratio, and/or by utilizing a higher compression ratio. During HCCI combustion, autoignition of the combustion chamber gas may be controlled so as to occur at a prescribed time so that a desired engine torque is produced. Since the temperature of the intake air entering the combustion chamber may be relevant to achieving the desired autoignition timing, operating in HCCI mode at high and/or low engine loads may be difficult.

Figure 2:
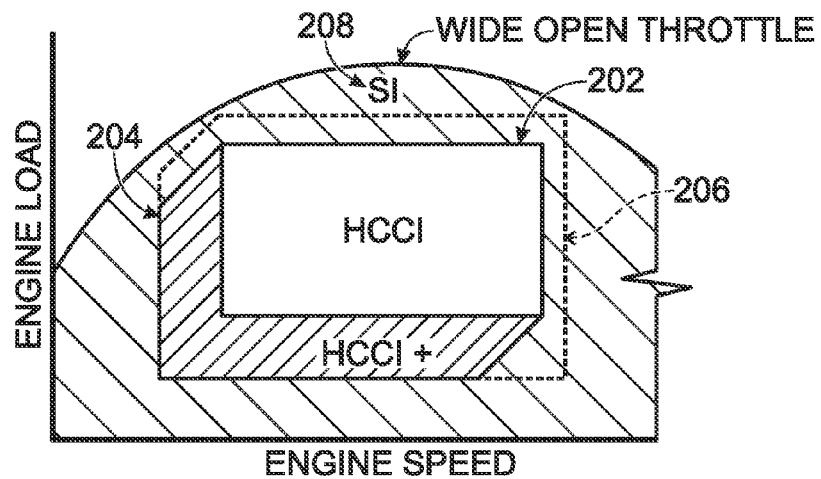
FIG. 2 schematically plots combustion mode suitability for different engine operating conditions.

FIG. 2 schematically shows a graphic representation of a nonlimiting example of engine operating conditions that are suitable for HCCI. In particular, engine speeds and engine loads that are suitable for HCCI are indicated at 202. While HCCI operating region 202 is schematically shown as a rectangle, it should be understood that a more complex relationship between engine load and engine operating speed may provide conditions suitable for HCCI. Furthermore, variables other than engine load and engine speed may affect which engine operating conditions are suitable for HCCI.

As is schematically shown in FIG. 2, HCCI operating region 202 does not extend to low engine speeds or low engine loads. A glow plug can be used to add heat to a combustion chamber, thus extending the range of engine operating conditions suitable for HCCI. A glow plug assisted HCCI region is schematically shown at 204. While glow plug assisted HCCI region extends the low engine speed and/or low engine load engine operating conditions suitable for HCCI, it should be understood that a glow plug may additionally or alternatively be used to extend the high engine speed and/or high engine load engine operating conditions suitable for HCCI, as indicated in dashed lines at 206. Spark ignition can be used for engine operating conditions that are outside the bounds of HCCI operating region 202 and glow plug assisted HCCI region 204 (and/or 206), as indicated by SI operating region 208. Furthermore, spark ignition can be used for engine operating conditions that are suitable for HCCI and/or glow plug assisted HCCI, if desired.

Figure 3:
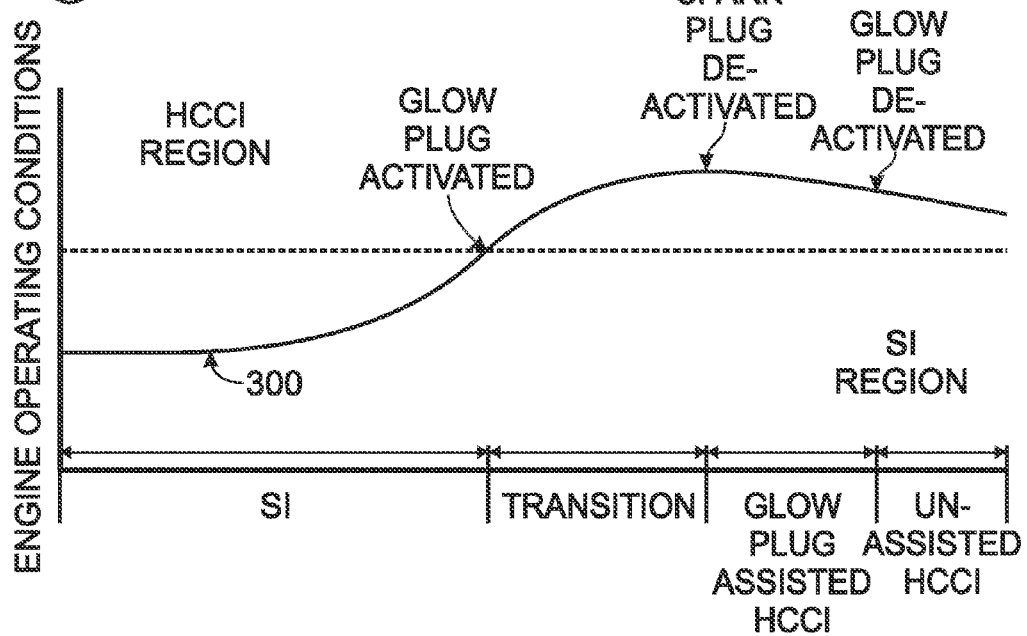
FIG. 3 schematically plots spark plug and glow plug control as engine operating conditions change.

FIG. 3 shows combustion mode plotted as engine operating conditions change. Area above the HCCI THRESHOLD line represents engine operating conditions that are suitable for HCCI. Area below the HCCI THRESHOLD line represents engine operating conditions that are not suitable for HCCI. As used with reference to FIG. 3, "engine operating conditions" can represent one or more parameters, such as engine speed, engine load, gear changes, combustion chamber temperature, and/or others. Line 300 schematically represents the various factors that are collectively described as the engine operating conditions. When the line is above the HCCI THRESHOLD, conditions are suitable for HCCI. When the line is below the HCCI THRESHOLD, conditions are suitable for spark ignition.

A glow plug can be used to improve transition between SI and HCCI and/or vice versa. As an example, when conditions for HCCI operation are met (e.g., the HCCI speed/load window of operation has been entered), the glow plug can be activated. When enough time for the glow plug to take affect has elapsed, a mode switch from SI to HCCI can be performed. Then, when stable HCCI is achieved, the glow plug can be deactivated.

A similar process flow can be performed when switching from HCCI operation to SI operation. In particular, when engine operating conditions have reached, or are nearing, an SI operating region, a glow plug can be activated during the transitory period in which spark plug operation begins.

Furthermore, a similar control flow logic can be used for mode switches that occur during HCCI operation, for example, when switching between different HCCI fuel injection strategies. As a nonlimiting example, a glow plug can be used during transitions between a first HCCI injection strategy and a second HCCI injection strategy.

FIG. 4 is a flow chart that schematically illustrates a nonlimiting control strategy for heat assisted HCCI mode switching. At 402, the present example begins with SI operation and no heat assist. At 404, engine operating conditions are assessed to determine whether conditions are suitable for HCCI operation. As with other decisions used in the control strategy, such an assessment can be performed by a control system cooperating with one or more sensors. If conditions are not suitable for HCCI, SI is continued. If conditions are suitable for HCCI, a heat source is activated to improve the transition between SI and HCCI, as shown at 406. At 408, it is determined whether a mode switch is feasible. If a mode switch is not feasible, SI operation continues with a heat source assist. If a mode switch is feasible, HCCI operation begins at 410. At 412 it is determined whether stable HCCI operation has been achieved. Stable HCCI operation may be assessed, for example, when the desired autoignition timing is detected via a combustion sensor and/or via an ion sensor. If stable HCCI operation has not been achieved, HCCI operation may continue with a heat source assist. If stable operation has been achieved, the heat source can be deactivated at 414. At 416 it is determined if conditions for SI are present. If not, HCCI operation continues. If conditions are suitable for SI, the heat source is activated at 418. At 420, it is determined whether a mode switch is feasible. If not, HCCI operation may continue with a heat source assist. If a mode switch is feasible, SI operation begins at 422. At 424 it is determined if stable SI operation has been achieved. If not, SI operation continues with a heat source assist. If stable SI operation exists, the heat source is deactivated at 402.

The following is a nonlimiting example of an engine system in which the above described HCCI controls can be implemented. While the description uses engine 24 as an example, it should be understood that the HCCI controls and/or the heat assists described herein can be implemented in a variety of differently configured engine systems. Turning now to FIG. 1, combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves. Furthermore, while one cylinder is illustrated in FIG. 1, an engine can include virtually any number of cylinders (e.g., 3 cylinders, 4 cylinders, 6 cylinders, 8 cylinders, 10 cylinders, 12 cylinders, etc.).

Universal Exhaust Gas Oxygen (UEGO) sensor 76 is shown coupled to exhaust manifold 47 upstream of a catalytic converter 70. Exhaust gas sensor 76 is shown coupled to exhaust manifold 47 upstream of catalytic converter 70. The signal from sensor 76 can be used to advantage during feedback air/fuel control to maintain average air/fuel at (or very near) stoichiometry during the stoichiometric homogeneous mode of operation.

Engine 24 can include an exhaust gas recirculation (EGR) system configured to supply exhaust gas to intake manifold 43 from exhaust manifold 47 via EGR passage 131. The amount of exhaust gas supplied by the EGR system can be controlled by EGR valve 134. Further, the exhaust gas within EGR passage 131 may be monitored by an EGR sensor 133, which can be configured to measure temperature, pressure, gas concentration, etc. Under some conditions, the EGR system may be used to regulate the temperature of the air and fuel mixture within the combustion chamber, thus providing a method of controlling the timing of autoignition for HCCI combustion. An EGR system is not required in all embodiments.

In some embodiments, engine 24 can include a boosting device such as a turbocharger or a supercharger. For example, a turbocharger having a compressor communicatively coupled within the intake passage upstream of the engine and may be used during some operations to increase the pressure of the intake air provided to one or more cylinders of the engine. However, in some conditions, boosting may complicate temperature control of the combustion chamber, thereby making autoignition timing control more difficult. As such, in some embodiments, the use of a glow plug to provide selective charge heating may be varied in response to the amount of boost provided by a turbocharger and/or a supercharger, at least under some conditions.

In some embodiments, valve control may be provided by variable cam timing (VCT), cam profile switching (CPS), and/or variable valve lift (VVL); however other methods may be used such as electrically controlled valves. FIG. 1 shows intake valve 52 and exhaust valve 54 controlled by cam shafts 130 and 132, respectively. Further, the valve timing (e.g. timing of opening and closing of valves) and/or valve lift (e.g. lift height and lift duration) may be varied via actuators 136 and 138, based on operating conditions. The actuators may be hydraulically powered, or electrically actuated, or combinations thereof to provide for variable cam timing and/or cam profile switching in response to signals received from the control system. For example, signal line 150 can send a valve control signal including a cam timing signal and/or cam selection signal to unit 136 and receive a cam timing measurement. Likewise, signal line 152 can send a valve control signal including a cam timing signal and/or cam selection signal to unit 138 and receive a cam timing measurement. While in this example, independent intake cam timing and exhaust cam timing are shown, variable intake cam timing may be used with fixed exhaust cam timing, or vice versa. Also, various types of variable valve timing may be used, such as the hydraulic vane-type actuators from a control system 48.

In some embodiments, cam actuated exhaust valves may be used with electrically actuated intake valves, if desired. In such a case, the control system can determine whether the engine is being stopped or pre-positioned to a condition with the exhaust valve at least partially open, and if so, hold the intake valve(s) closed during at least a portion of the engine stopped duration to reduce communication between the intake and exhaust manifolds. In addition, intake manifold 43 is shown communicating with an electronic throttle 125. As with other exemplary components illustrated in FIG. 1, an electronic throttle 125 is not required in all embodiments.

Engine 24 includes a fuel injector 65 for delivering liquid fuel directly to combustion chamber 29 in proportion to the pulse width of signal Fpw from control system 48. As shown, the engine may be configured such that the fuel is injected directly into the engine cylinder, which is known to those skilled in the art as direct injection.

Control system 48 is shown in FIG. 1 as including a conventional microcomputer including: microprocessor unit 102, input/output ports 104, and read-only memory 106, random access memory 108, keep alive memory 110, and a data bus. A control system can include more than one of any of the above described components, and/or any alternative or additional components that can be used to execute monitoring, decision-making, and/or control instructions. Control system 48 is shown receiving various signals, including signals from sensors coupled to engine 24. Exemplary signals include engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement of engine air charge temperature or manifold temperature from temperature sensor 117; and an engine position sensor from a Hall effect sensor 118 sensing crankshaft 39 position. In some embodiments, the requested wheel output can be determined by pedal position, vehicle speed, and/or engine operating conditions, etc. In one aspect of the present description, engine position sensor 118 produces a predetermined number of equally spaced pulses every revolution of the crankshaft from which engine speed (RPM) can be determined.

Engine 24 includes an aftertreatment system comprising a catalytic converter 70 and a lean NOx trap 72. In this particular example, temperature Tcat1 of catalytic converter 70 is measured by temperature sensor 77 and temperature Tcat2 of lean NOx trap 72 is measured by temperature sensor 75. Further, gas sensor 73 is shown arranged in exhaust passage 47 downstream of lean NOx trap 72, wherein gas sensor 73 can be configured to measure the concentration of NOx and/or O2 in the exhaust gas. Lean NOx trap 72 may include a three-way catalyst that is configured to adsorb NOx when engine 24 is operating lean of stoichiometry. The adsorbed NOx can be subsequently reacted with HC and CO and catalyzed when control system 48 causes engine 24 to operate in either a rich homogeneous mode or a near stoichiometric homogeneous mode such operation occurs during a NOx purge cycle when it is desired to purge stored NOx from the lean NOx trap, or during a vapor purge cycle to recover fuel vapors from fuel tank 160 and fuel vapor storage canister 164 via purge control valve 168, or during operating modes requiring more engine power, or during operation modes regulating temperature of the omission control devices such as catalyst 70 or lean NOx trap 72. Various different types and configurations of emission control devices and purging systems may be employed.

In some embodiments, engine 24 while operating in HCCI mode may transition to SI mode to purge the lean NOx trap. Since it may be desirable to reduce transitions between combustion modes, the condition of the lean NOx trap can be considered in conjunction with engine operating conditions before performing a transition. Alternatively, in some embodiments, the lean NOx trap may be purged, irregardless of or independent from the condition of the lean NOx trap, prior to transitioning to HCCI mode to maximize the capacity of the trap thereby further reducing future engine transitions. The condition of the lean NOx trap may be inferred through estimation based on engine past or predicted engine operating conditions and/or may be measured by sensor 75 or NOx sensor 73, for example. If it is determined or predicted that the capacity of the lean NOx trap needs purging, the engine may transition from HCCI mode to SI mode or remain in SI mode, wherein the engine is temporarily operated at stoichiometry or rich of stoichiometry to purge the lean NOx trap. In some embodiments, transitions between combustion modes may include an intermediate combustion mode, which could include any of the combustion modes described herein among others.

In some embodiments, the control system may be configured to transition the engine from HCCI mode to SI mode when the temperature of the exhaust aftertreatment system (catalyst 70 and/or lean NOx trap 72, among others) is determined to be too low (i.e. lower than a threshold), since the HCCI exhaust temperature can be substantially lower than the SI exhaust temperature under some conditions. Alternatively, in some embodiments, a transition from SI mode to HCCI mode may be performed when the exhaust temperature is determined to be too high and/or higher than a threshold. Further, in some embodiments, a transition between combustion modes may be based at least partially on a condition of the heating ventilation and air conditioning (HVAC) system. For example, during some conditions, HCCI mode may not provide sufficient passenger cabin heat in cold ambient conditions. In another example, if an air conditioning (A/C) compressor is operated, the additional engine output required to operate the compressor may cause the engine output to become greater than an upper limit of the HCCI operating range. Further, in some embodiments, a transition between combustion modes may be based at least partially on a condition or state of the transmission. For example, when the torque converter is in a locked configuration, the high torque pulsations and high rate of pressure rise from HCCI operations may be less acceptable than when the torque converter is in an unlocked configuration. In other words, the operating range for HCCI mode may be different depending on whether the converter is locked or unlocked. Similarly, different gears or gearing configurations within the transmission may be more sensitive to noise and vibration harshness (NVH) during HCCI mode. Thus, it should be understood that the control system may be configured to transition the engine between combustion modes based on any of the above mentioned conditions.

As described above with reference to FIG. 1, engine 24 may include a fuel vapor purge system comprising fuel tank 160, fuel vapor storage canister 164, and purge control valve 168 fluidly coupled to intake manifold 43. In some embodiments, the internal combustion engine can be configured to operate in a first purge state, in which fuel vapors are permitted to be received from the fuel vapor purge system only into combustion cylinders that are operating in the spark ignition mode, and in a second purge state, in which fuel vapors are permitted to be received from the fuel vapor purge system into combustion cylinders operating in the spark ignition mode and into combustion cylinders operating in the HCCI mode. Such an engine provides the benefits of multiple combustion modes while making efficient use of evaporated fuel vapors. Further, it is possible to reduce uncertainties in auto-ignition timing, thereby enabling improved HCCI operation.

The invention claimed is:

1. A method of operating an engine, the method comprising:
    activating a spark plug for one or more spark ignition combustion events; then
    deactivating the spark plug for one or more HCCI combustion events, then
    activating a heating device for one or more combustion events when engine operating conditions are outside a bounds of unassisted HCCI combustion while said spark plug is deactivated; and then
    deactivating the heating device for one or more unassisted HCCI combustion events.

2. The method of claim 1, wherein said heating device is a glow plug, and wherein said glow plug is in a combustion chamber of said plural-ignition-mode engine.

3. The method of claim 2, further comprising reactivating the glow plug for one or more hybrid HCCI/SI combustion events prior to returning to unassisted SI.

4. The method of claim 1, further comprising a second heating device said second heating device activated for one or more combustion events when engine operating conditions are outside said bounds of unassisted HCCI combustion while said spark plug is deactivated.

5. The method of claim 1, further comprising purging a NOx trap during said unassisted HCCI combustion events.

6. The method of claim 1, wherein said heating device is activated during a gear change.

7. The method of claim 1, further comprising recognizing stable HCCI combustion, wherein the heating device is deactivated after stable HCCI combustion is recognized.

8. The method of claim 7, wherein recognizing stable HCCI combustion includes assessing engine speed.

9. The method of claim 7, wherein recognizing stable HCCI combustion includes assessing engine load.

10. The method of claim 7, wherein recognizing stable HCCI combustion includes assessing combustion chamber temperature.

11. A method of transitioning between homogeneous charge compression ignition and spark ignition in a combustion chamber of an engine, the method comprising:
    during a gear change heating contents of the combustion chamber with a glow plug prior to transitioning between spark ignition and homogeneous charge compression ignition; and
    adjusting at least one of a air/fuel ratio, throttle position, amount of fuel injected, timing of fuel injection, number of fuel injections performed during a cycle, intake and exhaust valve timing, spark timing, contribution of EGR, EGR cooling, intake air temperature.

12. The method of claim 11, wherein heating contents of the combustion chamber with a glow plug prior to transitioning between homogeneous charge compression ignition and spark ignition includes heating the combustion chamber during at least part of an interval between a last homogeneous charge compression ignition and a first spark ignition.

13. An engine, comprising:
    a combustion chamber;
    a spark plug providing ignition spark to said combustion chamber;
    a heating device for adding heat directly to said combustion chamber;
    a control system including instructions for HCCI combustion during a first operating condition, said control system including instructions for HCCI combustion and activating said heating device while said spark plug is deactivated during a second operating condition.

14. The engine of claim 13, wherein said control system further includes instructions for combusting an air-fuel mixture while said spark plug is activated during a third operating condition.

15. The engine of claim 13, wherein the control system includes at least one sensor to assess engine speed, and wherein assessed engine speed at least partially indicates suitability for spark ignition and homogeneous charge compression ignition.

16. The engine of claim 13, wherein the control system includes at least one sensor to assess engine load, and wherein assessed engine load at least partially indicates suitability for spark ignition and homogeneous charge compression ignition.

17. The engine of claim 13, wherein the control system includes at least one sensor to assess combustion chamber temperature, and wherein assessed combustion chamber temperature at least partially indicates suitability for spark ignition and homogeneous charge compression ignition.

18. The engine of claim 13, further comprising an exhaust system including a NOx trap.

19. The engine of claim 13, further comprising an injector for injecting fuel directly into said combustion chamber.

20. The engine of claim 13, wherein said control system includes instructions for assessing engine conditions suitable for HCCI combustion.

\* \* \* \* \*